Figure 3:
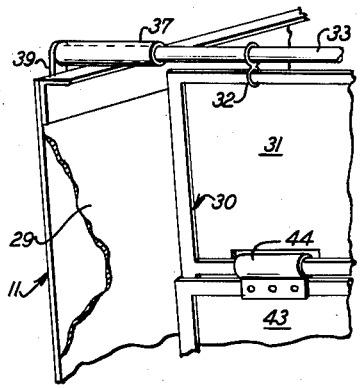

Nov. 13, 1962     H. H. ELSTNER     3,063,416
HORIZONTAL SELF-FEEDING SILO
Filed April 5, 1960     2 Sheets-Sheet 1
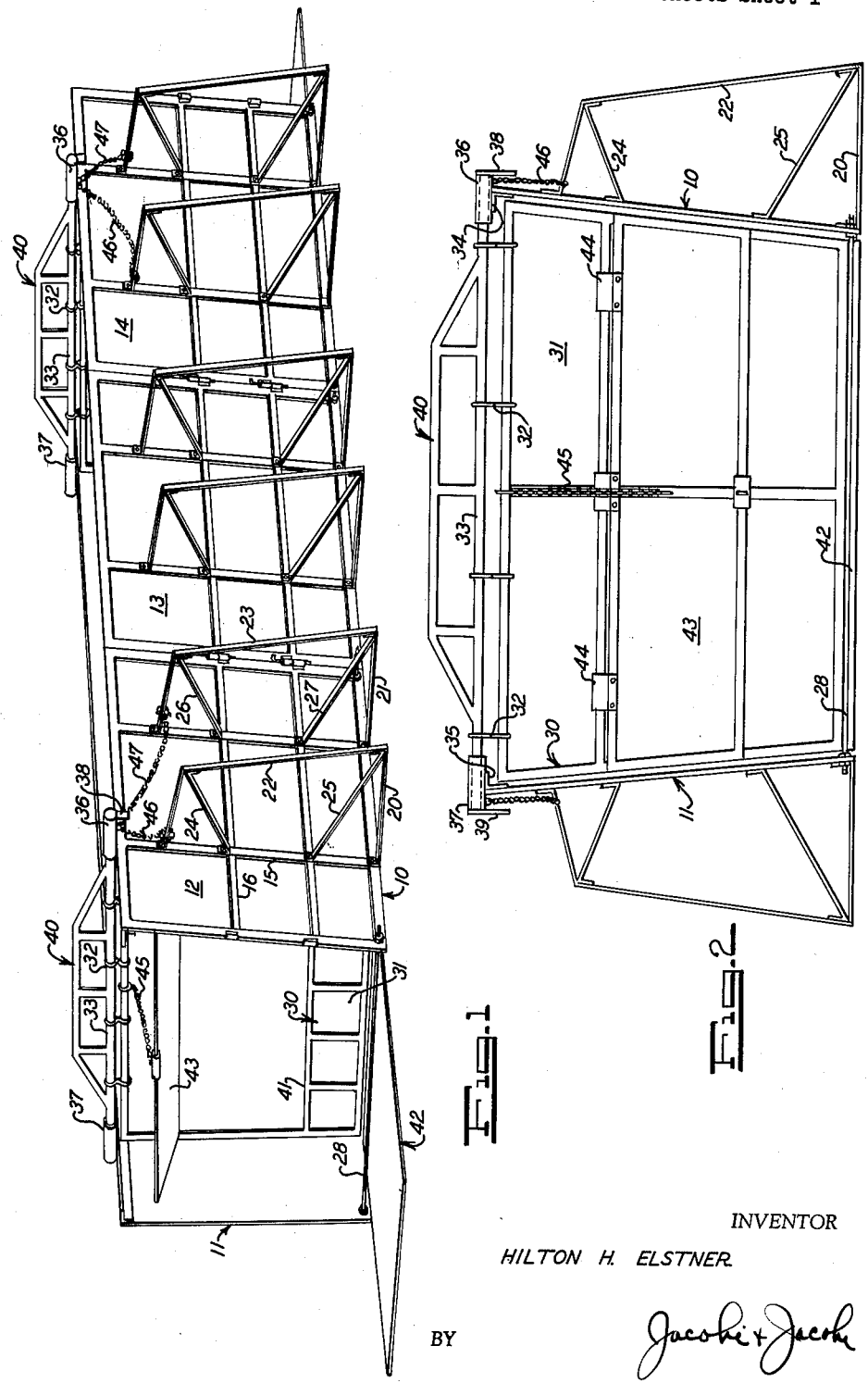
INVENTOR
HILTON H. ELSTNER.
BY Jacobi + Jacobi
ATTORNEYS Nov. 13, 1962   H. H. ELSTNER   3,063,416
HORIZONTAL SELF-FEEDING SILO
Filed April 5, 1960   2 Sheets-Sheet 2

INVENTOR
HILTON H. ELSTNER
BY Jacobi & Jacobi
ATTORNEYS

United States Patent Office 3,063,416
Patented Nov. 13, 1962

3,063,416
HORIZONTAL SELF-FEEDING SILO
Hilton H. Elstner, R.F.D. 2, Hallettsville, Tex.
Filed Apr. 5, 1960, Ser. No. 20,168
11 Claims. (Cl. 119—51)

This invention relates to the storage and feeding of livestock feed, such as ensilage and more particularly to a horizontal silo which may be conveniently utilized to store livestock feed in any desired amount and which permits convenient consumption of such feed directly from the silo by cattle or other livestock.

Heretofore ensilage has normally been stored in circular upright silos which constitute permanent and relatively costly structures and moreover, the capacity of these prior art silos could not be varied thereby necessitating the construction of a silo to accommodate the maximum quantity of ensilage which it was expected to store and this resulted in waste space and a greater cost than was sometimes necessary. It has also been proposed to store feed or ensilage in stacks on the ground or in pits dug in the ground, but this has not proved particularly satisfactory, in that the feed or ensilage is not properly confined or protected from the elements and furthermore, was easily scattered and wasted by cattle or livestock.

It is accordingly an object of the present invention to provide a horizontal self-feeding silo which may be conveniently and economically constructed on any available plot of substantially level ground and in which the size of the silo may be conveniently varied to accommodate any desired quantity of ensilage or other feed.

A further object of the invention is the provision of a horizontal self-feeding silo which may be conveniently and economically constructed from material readily available on a farm and in which the silo may be erected in any suitable location.

A still further object of the invention is the provision of a horizontal self-feeding silo which may be constructed and erected without special tools or any particular special skill and which will serve to adequately contain and protect ensilage or other feed for cattle or livestock.

Another object of the inevntion is the provision of a horizontal self-feeding silo in which movable closures are provided at one or both ends of the silo, such closures being provided with openings to permit direct feeding by livestock or cattle from the interior of the silo and in which the closures are moved inwardly toward the center of the silo as the feed is consumed, such inward movement being accomplished manually or by the pressure of the cattle or other livestock against the closures.

A further object of the invention is the provision of a horizontal self-feeding silo which serves to provide for storage of ensilage or other livestock feed and which permits direct feeding by cattle or livestock from the silo there being means provided for preventing such feeding when desired.

A still further object of the invention is the provision of a horizontal self-feeding silo including side walls made up of removable sections to permit construction of a silo of any desired size, there being convenient releasable means for securing adjacent sections together, each section also being provided with suitable support and bracing means.

Another object of the invention is the provision of a horizontal self-feeding silo in which movable closures are provided at one or both ends of the silo, there being means provided for limiting movement of such closures as desired.

A further object of the invention is the provision of a horizontal self-feeding silo in which movable closures are provided at one or both ends of the silo, such closures being provided with openings to permit direct feeding by livestock or cattle from the interior of the silo, there being a movable apron provided at one or both ends of the silo to provide a suitable support for the cattle or other livestock feeding from the silo.

A still further object of the invention is the provision of a horizontal self-feeding silo in which movable closures are provided at one or both ends of the silo, such closures being divided into two transversely spaced sections or panels, there being an opening provided in each panel to permit feeding by cattle from one or both sides of the silo, together with closure means for the openings and means to maintain the closure means in open position to permit feeding from either or both sides of the silo.

Another object of the invention is the provision of a horizontal self-feeding silo constructed of side walls, including wall sections diverging upwardly from the ground, there being tie bars connecting the lower edges of the opposed sections to prevent undue spreading thereof resulting from the weight of ensilage or other livestock feed within the silo.

Figure 4:
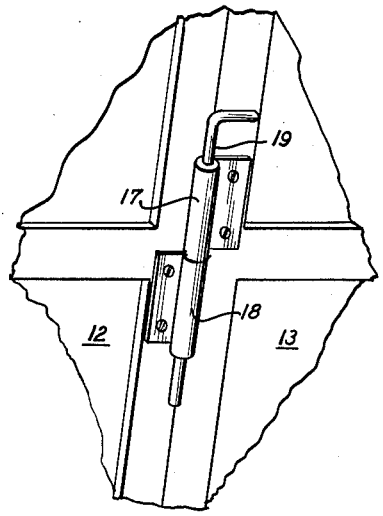
Figure 5:
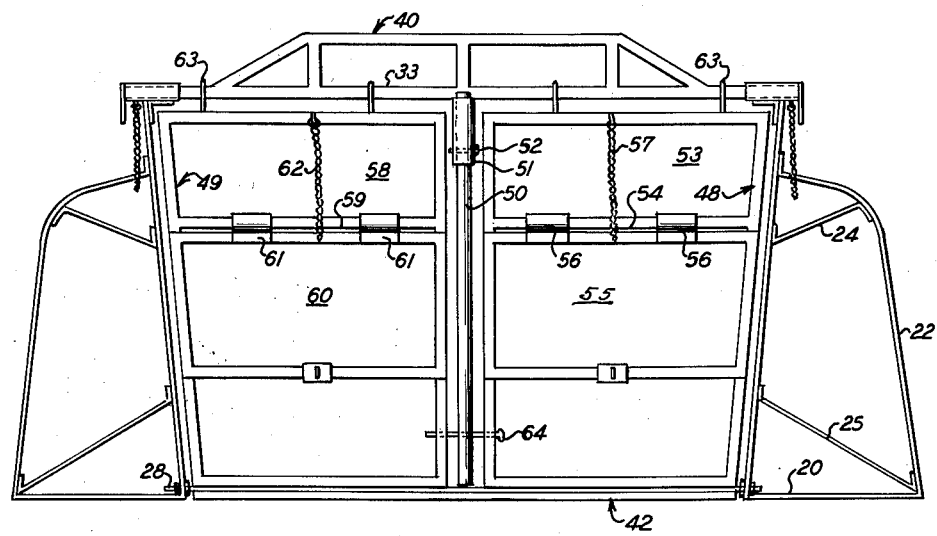

Further objects and advantages of the invention will be apparent from the following description taken in conjunction with the accompanying drawing wherein:

FIG. 1 is a view in perspective showing a horizontal self-feeding silo constructed in accordance with this invention and with the door for closing the feeding opening in one end closure shown in open position to permit feeding from the silo;

FIG. 2 an enlarged end elevational view of the silo shown in FIG. 1 and with the door in closed position;

FIG. 3 a further enlarged fragmentary view in perspective showing the engagement of the supporting means for the closures with the rails on the upper edges of the sidewalls of the silo, as well as the waterproof lining for the sidewalls;

FIG. 4 a fragmentary view to an enlarged scale showing the manner of releasably connecting one wall section to another; and FIG. 5 an end elevational view of a modified form of the invention showing an end closure divided into two sections.

With continued reference to the drawing, there is shown a horizontal self-feeding silo constructed in accordance with this invention and which may well comprise spaced sidewalls 10 and 11 supported on the ground and diverging upwardly. Each sidewall may be composed of sections 12, 13 and 14, although any number of such sections may be employed. Each section may be made up of boards secured together by suitable vertical and horizontal cleats 15 and 16 respectively and as best shown in FIGS. 1 and 4, adjacent sections may be releasably secured together by an eye 17 secured to one section, such as 13 as shown in FIG. 4 and overlapping and in alignment with another eye 18 secured to a section, such as 12 and with a pin 19 removably inserted through the aligned eyes 17 and 18, the pin 19 operating to hold the adjacent sections in position. In this manner, the silo may be constructed in any desired length and thereby accommodate any desired quantity of ensilage or livestock feed.

In order to properly support the sidewalls 10 and 11 in position on the ground, each section of each sidewall may be provided with a plurality of foot members 20 and 21 secured to each section adjacent the lower edge thereof and extending outwardly therefrom and connected to each foot member 20 and 21 adjacent the outer ends thereof, are upwardly and inwardly extending brace members 22 and 23 secured to each section below the upper edge thereof. In order to provide further bracing for the sidewalls, tie members 24 and 25 may be connected between the section and the brace member 22 and tie members 26 and 27 may also be connected between the section and the brace member 23. The foot members 20 and 21 firmly engage the ground and through the brace members 22 and 23 and the tie members 24, 25, 26 and 27 firmly support each section forming the sidewalls in position. Since ensilage or other livestock feed within the silo tends to force the sidewalls 10 and 11 apart, particularly at the bottom, there has been provided a plurality of tie bars 28 connecting the lower edges of opposed sections 12, 13 and 14 at spaced points. If desired, and in order to protect the sidewalls 10 and 11 from moisture or juices exuding from the ensilage or other livestock feed, the interior surface of the sidewalls 10 and 11 may be covered with a waterproof lining 29 of metal or other suitable material as clearly shown in FIG. 3.

One or both ends of the silo of this invention may be closed by a suitable movable closure 30 which may comprise a panel 31 constructed in any suitable manner and suspended by links 32 or other suitable suspension means from a bar 33 extending across the silo and above the upper edges of the sidewalls 10 and 11. The upper edge of sidewall 10 is provided with a track 34 extending throughout the length thereof and the sidewall 11 is also provided with a similar track 35 extending throughout the length thereof. The bar 33 is provided at opposite ends with rollers 36 and 37 which serve to engage the tracks 34 and 35 respectively and support the bar 33 and closure 30 suspended therefrom for movement longitudinally of the silo. The rollers 36 and 37 may well comprise sleeves rotatably received on the ends of the bar 33. In order to prevent inadvertent disengagement of the rollers 36 and 37 from the tracks 34 and 35, there may be provided downwardly extending fingers 38 and 39 on each end of the bar 33 and such fingers will serve to engage the sidewalls 10 and 11 and prevent inadvertent displacement of the rollers 36 and 37 from the tracks 34 and 35. In order to provide additional strength for the bar 33, there may be provided a truss structure 40 on the upper side thereof.

The panel 31 comprising the end closure 30 is provided with a horizontal opening 41 therein to expose the contents of the silo to permit cattle or other livestock to feed therefrom and as the feed in the silo is consumed, the closure 30 is moved inwardly of the silo toward the center thereof by pressure of the cattle or other livestock against the closure. In order to provide firm footing for cattle or other livestock feeding from the silo through the opening 41 in the closure 30, there may be provided a movable apron 42 of any suitable material which, as clearly shown in FIG. 1, is disposed on the ground between the sidewalls 10 and 11 and adjacent the closure 30.

At certain times it may be desirable to prevent feeding of cattle from the silo and for this purpose there may be provided a door 43 for closing the opening 41 and the door 43 may be mounted by hinges 44 on the panel 31 of the closure 30 for movement from a closed position as shown in FIG. 2, to an open position as shown in FIG. 1. In order to support the door 43 in open position, there may be provided a chain 45 or other suitable means for connecting the outer edge of the door 43 with the upper edge of the panel 31 in order to retain the door 43 in open position as clearly shown in FIG. 1. As stated, a movable closure 30 may be provided at each end of the silo or a fixed closure may be provided at one end and a movable closure at the other.

Since at certain times it may be desirable to prevent feeding cattle beyond a certain point in the silo without the necessity for closing the door 43, there may be provided flexible members, such as chains 46 and 47 connected to each end of the bar 33 and in turn, releasably connected to the brace members 22 and 23 or to other fastening means on the sidewalls 10 and 11. In this manner, the flexible members 46 and 47 will only permit movement of the closure 30 to a certain point within the silo and when it is desired to permit feeding beyond this point, the flexible members 46 and 47 may be moved to new locations.

With particular reference to FIG. 5, there is shown a slightly modified form of the invention in which the movable closure is divided into two sections 48 and 49, there being a vertically disposed rod 50 removably received in a socket 51 and secured thereto by a removable pin 52, the socket 51 and rod 50 depending from the bar 33 substantially midway of the length thereof. The closure 48 may well comprise a panel 53 provided with a horizontal opening 54 which may be closed by a door 55 hingedly mounted on the panel 53. A chain or other suitable means 57 may be utilized to hold the door 55 in open position in the same manner as the door in the first described form of the invention.

In a similar manner, the closure 49 may comprise a panel 58 having a horizontal opening 59 therein and a door 60 for closing the opening 59 is hingedly mounted by hinges 61 on the panel 58. A chain or other suitable means 62 may be provided for holding the door 60 in open position as previously described.

The closures 48 and 49 are suspended from the bar 30 by links 63 or other suitable means and a removable pin 64 may extend through portions of the closures 48 and 49 and through the rod 50 in order to connect the closures 48 and 49 and the rod 50 together as a unit. The above described closure structure permits feeding from either or both sides of the silo as may be desired.

It will be seen that by the above described invention there has been provided a convenient and economical silo for storage of ensilage or other livestock feed which may be conveniently and economically constructed and also erected on any suitable piece of ground and which will serve to adequately contain and protect ensilage or other livestock feed and permit feeding of such contents directly from the silo.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to the section below the upper edge and extending outwardly and downwardly and connected to said foot member adjacent the outer end and tie members connected between the section and said brace member, tie bars connecting the lower edges of opposed sections at spaced points, a waterproof lining on the inner surface of each section, a track on the upper edge of each section extending throughout the length thereof, a movable closure for each end of said silo, each closure comprising a bar extending across said silo above said tracks, rollers on each end of said bar engaging said tracks, a truss on the upper side of said bar, a panel suspended from said bar between said sidewalls, to close the end of said silo, downwardly extending fingers on the outer ends of said bar to prevent disengagement of said rollers from said tracks, said panel having a horizontal opening to expose the contents of said silo for direct feeding by cattle, said closures being moved inwardly by pressure of the cattle against said panels as the contents of said silo are consumed, a door for closing the opening in each panel, each door being hingedly mounted on a horizontal axis adjacent the upper side of each opening, means for holding said doors in open position above said openings, flexible means connected to said opposite ends of said bars and releasably connected to said sections to limit inward movement of said closures and a movable apron disposed on the ground in front of each closure.

2. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to a section below the upper edge and extending outwardly and downwardly and connected to said foot member adjacent the outer end and tie members connected between the section and said brace member, tie bars connecting the lower edges of opposed sections at spaced points, a waterproof lining on the inner surface of each section, a track on the upper edge of each section extending throughout the length thereof, a movable closure for each end of said silo, each closure comprising a bar extending across said silo above said tracks, rollers on each end of said bar engaging said tracks, a truss on the upper side of said bar, a panel suspended from said bar between said sidewalls to close the end of said silo, downwardly extending fingers on the outer ends of said bar to prevent disengagement of said rollers from said tracks, said panel having a horizontal opening to expose the contents of said silo for direct feeding by cattle, said closures being moved inwardly by pressure of the cattle against said panels as the contents of said silo are consumed, a door for closing the opening in each panel, each door being hingedly mounted on a horizontal axis adjacent the upper side of each opening, means for holding said doors in open position above said openings and flexible means connected to the opposite ends of said bars and releasably connected to said sections to limit inward movement of said closures.

3. A horizontal self-feeding silo comprising spaced sidewalls supported on the ground and diverging upwardly, each side wall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to a section below the upper edge and extending outwardly and downwardly and connected to said foot member adjacent the outer end and tie members connected between the section and said brace member, tie bars connecting the lower edges of opposed sections at spaced points, a waterproof lining on the inner surface of each section, a track on the upper edge of each section extending throughout the length thereof, a movable closure for each end of said silo, each closure comprising a bar extending across said silo above said tracks, rollers on each end of said bar engaging said tracks, a panel suspended from said bar between said sidewall to close the end of said silo, downwardly extending fingers on the outer ends of said bar to prevent disengagement of said rollers from said tracks, said panel having a horizontal opening to expose the contents of said silo for direct feeding by cattle, said closures being moved inwardly by pressure of the cattle against said panels as the contents of said silo are consumed, a door for closing the opening in each panel, each door being hingedly mounted on a horizontal axis adjacent the upper side of each opening, means for holding said doors in open position above said openings and flexible means connected to opposite ends of said bars and releasably connected to said sections to limit inward movement of said closures.

4. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to a section below the upper edge and extending outwardly and downwardly and connected to said foot member adjacent the outer end and tie members connected between the section and said brace member, tie bars connecting the lower edges of opposed sections at spaced points, a waterproof lining on the inner surface of each section, a track on the upper edge of each section extending throughout the length thereof, a movable closure for each end of said silo, each closure comprising a bar extending across said silo above said tracks, rollers on each end of said bar engaging said tracks, a panel suspended from said bar between said sidewalls to close the end of said silo, downwardly extending fingers on the outer ends of said bar to prevent disengagement of said rollers from said tracks, said panel having a horizontal opening to expose the contents of said silo for direct feeding by cattle, said closure being moved inwardly by pressure of the cattle against said panel as the contents of said silo are consumed, a door for closing the opening in each panel, each door being hingedly mounted on a horizontal axis adjacent the upper side of each opening and means for holding said doors in open position above said openings.

5. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to a section below the upper edge and extending outwardly and downwardly and connected to said foot member adjacent the outer end and tie members connected between the section and said brace member, tie bars connecting the lower edges of opposed sections at adjacent points, a track on the upper edge of each section extending throughout the length thereof, a movable closure for each end of said silo, each closure comprising a bar extending across said silo above said tracks, rollers on each end of said bar engaging said tracks, a panel suspended from said bar between said sidewalls to close the end of said silo, downwardly extending fingers on the outer ends of said bar to prevent disengagement of said rollers from said tracks, said panel having a horizontal opening to expose the contents of said silo for direct feeding by cattle, said closures being moved inwardly by pressure of the cattle against said panel as the contents of said silo are consumed, a door for closing the opening in each panel, each door being hingedly mounted on a horizontal axis adjacent the upper side of each opening and means for holding said doors in open position above said openings.

6. A horizontal self-feeding silo as defined in claim 5 in which the means for securing said sections together comprises overlapping pairs of eye members on adjacent sections and removable pins extending through each pair of eye members.

7. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to a section below the upper edge and extending outwardly and downwardly and connected to said foot member adjacent the outer end and tie members connected between the section and said brace member, tie bars connecting the lower edges of opposed sections at spaced points, a track on the upper edge of each section extending throughout the length thereof, a movable closure for one end of said silo, said closure comprising a bar extending across said silo above said tracks, rollers on each end of said bar engaging said tracks, a panel suspended from said bar between said sidewalls to close the ends of said silo, means to prevent disengagement of said rollers from said tracks, said panel having a horizontal opening to expose the contents of said silo for direct feeding by cattle, said closure being moved inwardly by pressure of the cattle against said panel as the contents of said silo are consumed, a door for closing the opening in said panel, said door being hingedly mounted on a horizontal axis engaging the upper side of said opening and means for holding said door in open position above said opening.

8. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, each brace comprising a foot member secured to a section adjacent the lower edge and projecting outwardly in engagement with the ground, a brace member secured to a section below the upper edge and extending outwardly and downwardly and connected to said foot member adjacent the outer end, tie bars connecting the lower edges of opposed sections at spaced points, a track on the upper edge of each section extending throughout the length thereof, a movable closure for one end of said silo, said closure comprising a bar extending across said silo above said tracks, rollers on each end of said bar engaging said tracks, a panel suspended from said bar between said sidewalls to close the end of said silo, means to prevent disengagement of said rollers from said tracks, said panel having a horizontal opening to expose the contents of said silo for direct feeding by cattle, said closure being moved inwardly by pressure of the cattle against said panel as the contents of said silo are consumed, a door for closing the opening in said panel, said door being hingedly mounted on a horizontal axis adjacent the upper side of said opening and means for holding said door in open position above said opening.

9. A horizontal self-feeding silo as defined in claim 8 in which said closure member comprises a bar extending across said silo above said tracks, rollers on each end of said bar engaging said tracks, a removable rod depending from said bar midway between said sidewall, a panel swingably suspended from said bar between each sidewall and said rod, removable means for preventing swingable movement of each panel with respect to said rod, a horizontal opening in each panel, a door for closing each opening, each door being hingedly mounted on a horizontal axis adjacent the upper side of each opening and means for holding each door in open position above each opening.

10. A horizontal self-feeding silo as defined in claim 8 in which said closure member comprises a bar extending across said silo above said tracks, rollers on each end of said bar engaging said tracks, a rod depending from said bar midway between said sidewalls, a panel swingably suspended from said bar between each sidewall and said rod, removable means for preventing swinging movement of each panel with respect to said rod, a horizontal opening in each panel, a door for closing each opening, each door being hingedly mounted on a horizontal axis adjacent the upper side of each opening and means for holding each door in open position above each opening.

11. A horizontal self-feeding silo comprising spaced sidewalls supported on the ground and diverging upwardly, each sidewall being composed of removable sections placed end to end, whereby the horizontal length of said silo may be varied, means for securing said sections together, a plurality of braces for supporting each section, tie bars connecting the lower edges of opposed sections at spaced points, a track on the upper edge of each section extending throughout the length thereof, a movable closure for one end of said silo, said closure comprising a bar extending across said silo above said tracks, rollers on each end of said bar engaging said tracks, a panel suspended from said bar between said sidewalls to close the end of said silo, said panel having a horizontal opening to expose the contents of said silo for direct feeding by cattle, said closure being moved inwardly by pressure of the cattle against said panel as the contents of said silo are consumed, a door for closing the opening in said panel, said door being hingedly mounted on a horizontal axis adjacent the upper side of said opening and means for holding said door in open position above said opening.

References Cited in the file of this patent

UNITED STATES PATENTS

| | | |
|---|---|---|
| 2,270,992 | Billingsley | Jan. 27, 1942 |
| 2,520,555 | Major | Aug. 29, 1950 |
| 2,551,460 | Peterson | May 1, 1951 |
| 2,751,635 | Donnahue | June 26, 1956 |
| 2,763,093 | Scott et al. | Sept. 18, 1956 |
| 2,765,500 | Campus | Oct. 9, 1956 |
| 2,815,001 | Hanson | Dec. 3, 1957 |
| 2,843,085 | McKee | July 15, 1958 |